Patented Oct. 29, 1929

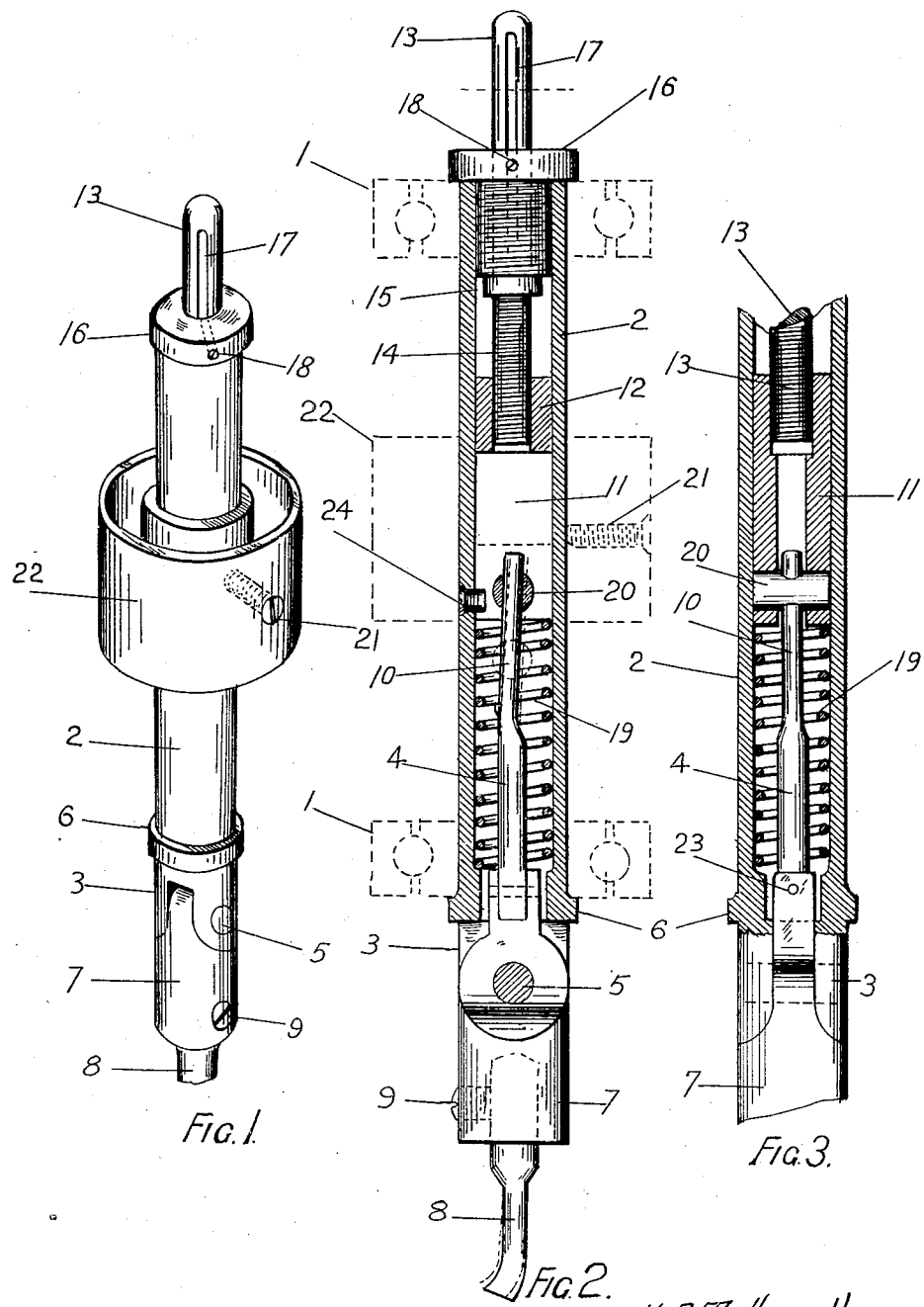

1,733,209

UNITED STATES PATENT OFFICE

HENRY PERCY TATTERSALL, OF MOSMAN, NEAR SYDNEY, NEW SOUTH WALES, AUSTRALIA

EXPANSIBLE BORING TOOL

Application filed April 21, 1927, Serial No. 185,542, and in Australia May 6, 1926.

This invention relates to expansible tools for boring holes in timber or in other like material. The object of the invention is to provide a tool which is of simple and cheap construction; is not likely to get out of order; and is serviceable and durable in use.

With reference to the accompanying drawings in which the invention is illustrated, Fig. 1 is a perspective view of the tool with part of the boring cutter attached thereto; Fig. 2 is a longitudinal section; and Fig. 3 is a longitudinal section on the opposite plane to that shown in Fig. 2.

Stationary bearings 1, shown in dotted lines in Fig. 2 are provided; these may be secured in any suitable location. Within such bearings 1 is situated a tubular member 2 whose foot is formed as cheeks 3 for a member 7 which is pivoted to said cheeks by a pin 5. The lower part of the tubular member 2 is also provided with a collar or shoulder 6 to bear against the lower face of one of the bearings 1.

Attached to the member 7, say by a pin 23, is the lower end of the spindle 4, the member 7 being adapted to receive the shank of a boring cutter 8 of any approved size or design which may be detachably secured to the member 7 by means of a removable pinching screw 9 or otherwise. The spindle 4 extends within the tubular member 2 to a suitable distance and portion 10 of it is kinked. Within the tubular member 2 is located a bifurcated block 11 whose head 12 is screw-tapped to receive a depressible rod 13, a portion of which is externally screw-threaded as at 14. On such rod is a collar or projection 15 which abuts preferably a screw cap 16 whose shank fits the head of the tubular member 2. The said cap 16 is holed to permit the rod 13 to pass therethrough. Said rod 13 may be flattened on one face or it may have a slot 17 into which the inner end of a screw 18 or the like, fitting the cap 16, may enter. By easing the screw 18 and turning the rod 13 adjustment of the block 11 is made as such block is associated with the rod 13.

Below the bifurcated block 11 in the tubular member 2 is a compressible coil spring 19 which surrounds the spindle 4 and abuts at one end the said block 11 and at the other end the lower portion of the said tubular member 2. In the block 11 are openings to receive a transverse turnable pin 20 or the like, the latter having an opening therein through which the upper end of the kinked portion 10 of the spindle projects. The block 11 is prevented from turning in the tubular member 2 by the adjustable screw 24 whose inner portion projects into the open space of the block 11.

Mounted on the tubular member 2 and fixed thereto by a screw 21 or the like is a drive pulley 22 for such member, which pulley may be rotated through any suitable power source.

The tool is usable for boring holes of any appropriate diameter whose walls may be either straight or tapered or if desired partly straight and partly tapered whether such tapering should be wider from the entrance end of the tool to the work or wider from the finishing end of the tool in the work.

When required for operation, the diameter of a straight walled hole required to be bored in the work by the boring cutter 8 may be fixed by regulating the rod 13 in relation to the bifurcated block 11 within the tubular member 2 whereby the angularity of the spindle 4—10 with the boring cutter 8 thereon for the desired hole will be fixed. After such adjustment of the rod 13 the hole may be bored by rotating the tubular member 2 with its affixed spindle 4—10 and the bifurcated block 11. If the hole to be bored is to be undercut to a certain depth a presser member of any desired type (not shown) is brought into operation against the upper end of the rod 13 after the straight walled portion of the hole has been made. When such presser member thus operates the bifurcated block 11 within the tubular member 2 such block is depressed therein whereby the upper end of the portion 10 of the spindle 4 is caused to slide in the opening in the turnable transverse pin 20 and consequently the angularity of the spindle 4—10 is altered together with the boring cutter 8 carried thereby and the desired undercut is made in the work. Upon pressure being relieved from the rod 13 the coil spring 19 operates to automatically lift the block 11 and so altering the angularity of the spindle 4—10 and the boring cutter 8 the latter is thus automatically enabled to be withdrawn from the hole which has been made in the work. Should the hole desired to be bored require to be tapered the presser means would be operated where necessary.

If desired a countersinking cutting tool may be associated with the boring cutter 8 and operated simultaneously therewith.

What I claim as my invention and desire to secure by Letters Patent is:—

1. An expansible boring tool comprising a rotatable tubular member, a component pivoted at one end to said tubular member and adapted to receive a boring cutter, an adjustable kinked spindle on said component and located within said tubular member, an adjustable bifurcated element arranged in free slidable relation to said tubular member and to the adjustable kinked spindle, means operably connected with said element for adjusting it whereby the angularity of the said spindle and the said component and the boring cutter received in the latter is adjustable, and the adjusting means for the bifurcated element determining a limit of the free sliding movement thereof so as to maintain the kinked spindle at a particular angle at one end of said movement.

2. An expansible boring tool according to claim 1, in which an apertured cap is removably mounted at one end of the tubular member, a rod passed through the cap and partially screw-threaded to fit the bifurcated element which is screw-tapped to receive the rod, whereby the said element is adjustable for the purpose of allowing adjustment of the angularity of the spindle and the component and the associated boring cutter.

3. An expansible boring tool according to claim 1, in which an apertured cap is mounted at one end of the tubular member, a partially screw-threaded rod passed through the cap and having a slot therein, a screw fitting the said cap and engaging said slot, and the bifurcated element being screw-tapped to receive the rod, whereby the said element is adjustable for the purpose of allowing adjustment of the angularity of the spindle and the component and the associated boring cutter.

4. An expansible boring tool according to claim 1, in which a turnable pin is mounted in the bifurcated element and is provided with a hole to enable one end of the kinked spindle to project therethrough.

5. The combination with an expansible boring tool according to claim 1, of a compressible coil spring adapted to be compressed when pressure is applied to the bifurcated element, whereby the angularity of the kinked spindle and the component pivoted to the tubular member and any associated boring cutter is altered, the said spring being also adapted to expand when pressure thereon is relieved by release of pressure from the bifurcated element, whereby the angularity of the said spindle and pivoted component with the associated boring cutter is again altered to permit the boring cutter to be automatically released from its work pieces.

In testimony whereof I affix my signature.

HENRY PERCY TATTERSALL.